Figure 1:
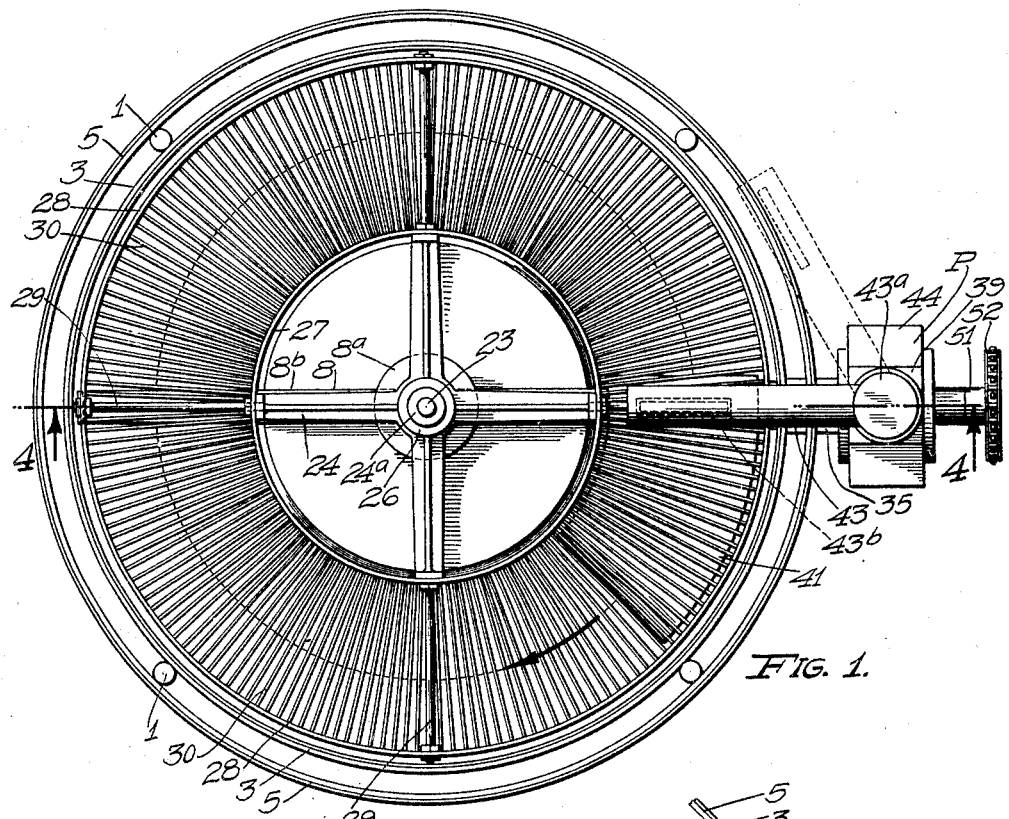

Jan. 31, 1928.

I. SHAFER 1,657,592

CANDY COATING MACHINE

Filed Jan. 29, 1926      3 Sheets-Sheet 1

INVENTOR.
IRA SHAFER
BY A. B. Bowman
ATTORNEY

Jan. 31, 1928.

I. SHAFER 1,657,592

CANDY COATING MACHINE

Filed Jan. 29, 1926     3 Sheets-Sheet 2

INVENTOR.
IRA SHAFER
BY A. B. Bowman
ATTORNEY

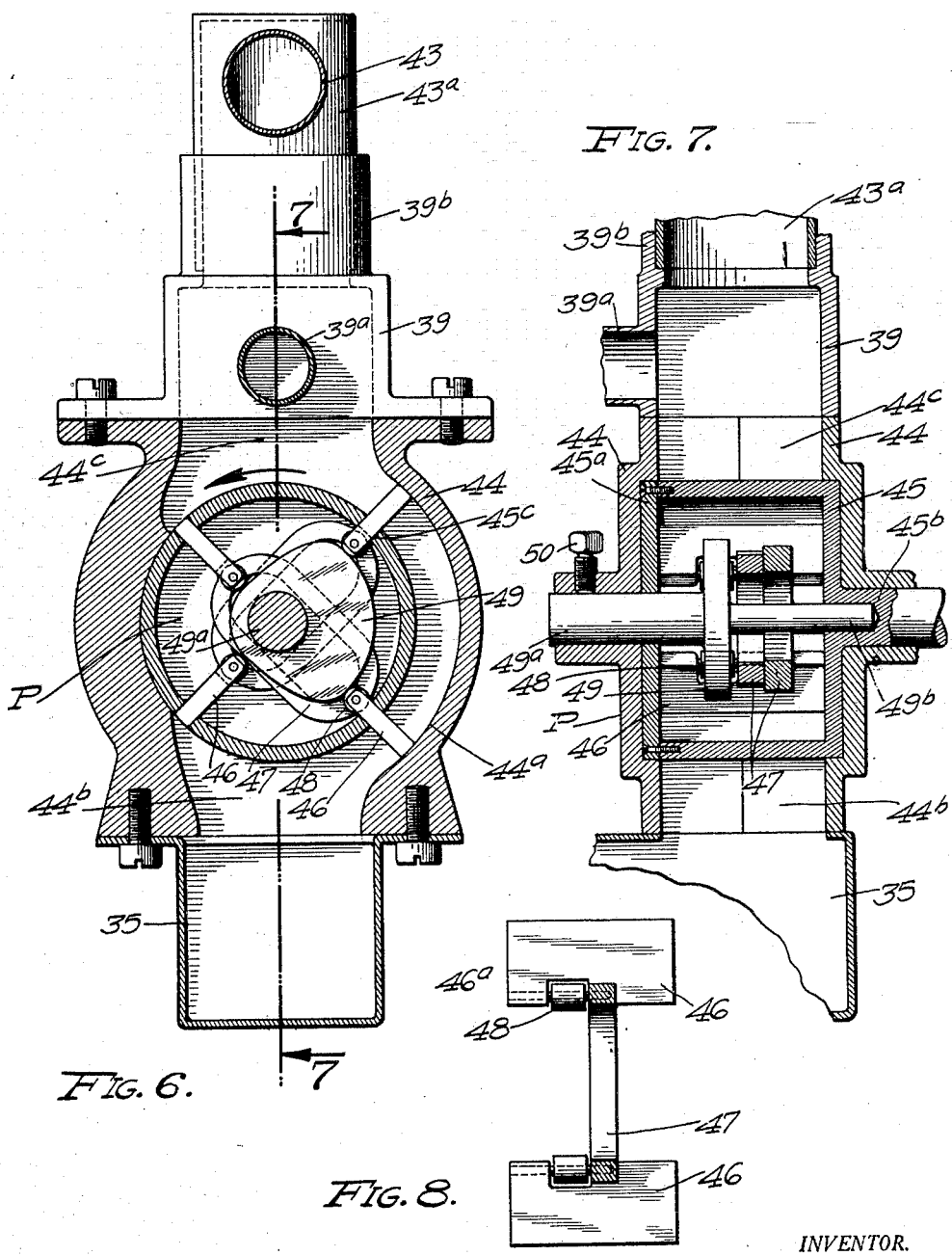

Patented Jan. 31, 1928.

1,657,592

UNITED STATES PATENT OFFICE.

IRA SHAFER, OF SAN DIEGO, CALIFORNIA.

CANDY-COATING MACHINE.

Application filed January 29, 1926. Serial No. 84,576.

My invention relates to candy coating machines, and the objects of my invention are: first, to provide a machine of this class which is particularly simple and economical of construction, easy to install, simple and economical to operate, economical in floor space requirements and fool-proof in its operation, thus particularly adapting the same for use in candy making establishments making relatively small quantities of candy and limited in floor space and help; second, to provide a machine of this class which is equally applicable for coating candies, cakes, or other food stuffs, or other products adapted to be coated; third, to provide a coating machine which requires a very small amount of chocolate or other coating to keep the same in efficient operation; fourth, to provide a machine of this class in which the chocolate or other coating is applied to the centers of the candy or other products from above and below in liberal amounts, so as to readily and effectively cover the centers; fifth, to provide a machine of this class in which the chocolate or other coating is taken from a draining heated reservoir and forced by means of a pump onto the centers of the candy or other products, thereby providing positive feed and action at all times; sixth, to provide a novelly constructed force feed pump for a coating machine of this class, which is adapted to pump or force a plain coating, such as plain chocolate, or a coating mixed with nuts or other solids of any amount, or coatings of any viscosity, onto the centers; seventh, to provide a machine of this class in which the coated candies or other products are adapted to be removed by hand for storage, thereby further economizing in the required floor space for operating the machine; eighth, to provide a machine of this class having a coating feed and guide plate positioned below the candy conveyer and adjustable relatively thereto so as to spread and gradually force the coating upwardly through the conveyer onto the bottom side of the candy or other centers; ninth, to provide a machine of this class from which the conveyer and other parts, subjected to the influence of the chocolate or other coating, may be easily removed for cleaning purposes, whereby the machine may be kept sanitary at all times; tenth, to provide a novelly constructed conveyer for a machine of this class; eleventh, to provide a novelly constructed drain and heating receptacle for the chocolate or other coating for a machine of this class; twelfth, to provide a machine of this class having a coating reservoir which may be easily kept hot and which may be uniformly heated; thirteenth, to provide a novel and compact drive mechanism for a machine of this class; fourteenth, to provide as a whole a novelly constructed coating machine, and fifteenth, to provide a machine of this class which is durable, efficient, and which will not readily deteriorate or get out of order.

Figures 2, 3:
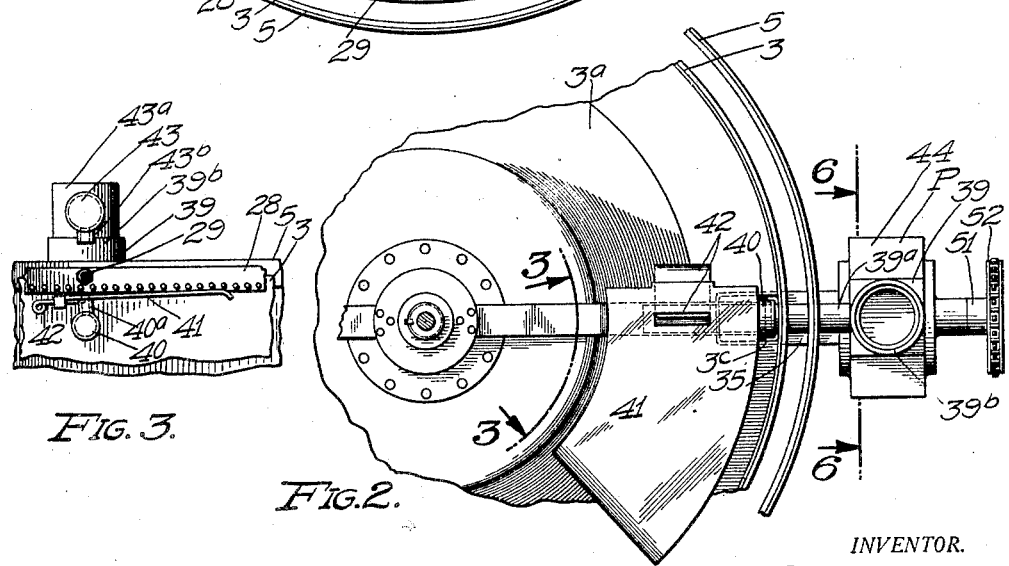
Figure 4:
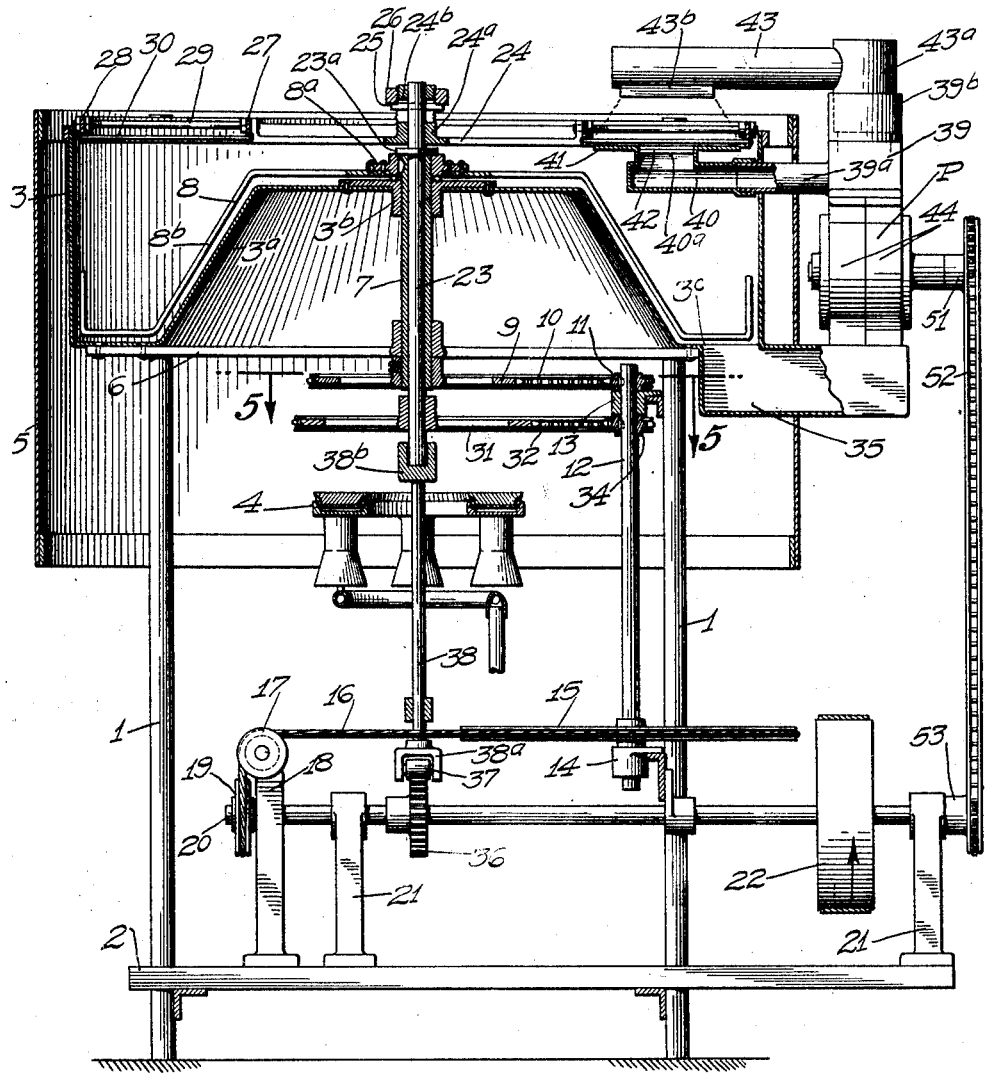
Figure 5:
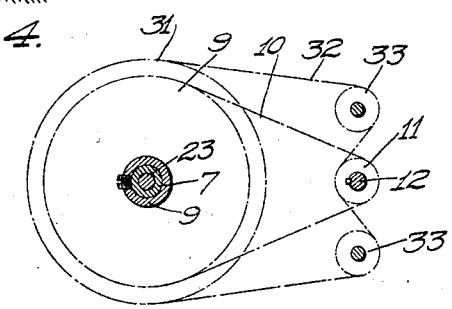

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a top view of my coating machine in its preferred embodiment with the upper chocolate or coating discharge spout shown by dotted lines in an out-of-the-way shifted position; Fig. 2 is a fragmentary top view thereof, with the conveyer and upper spout removed; Fig. 3 is a fragmentary sectional elevational view of the machine, taken through 3—3 of Fig. 2; Fig. 4 is a sectional elevational view thereof, taken through 4—4 of Fig. 1, showing certain parts and portions in elevation to facilitate the illustration; Fig. 5 is a diagrammatic sectional view, taken at 5—5 of Fig. 4, showing a portion of the drive mechanism; Fig. 6 is an enlarged sectional elevational view of the pump mechanism, taken through 6—6 of Fig. 2; Fig. 7 is a fragmentary sectional view thereof, taken through 7—7 of Fig. 6, and Fig. 8 is a side view of one of the blades of my special pump structure.

Like characters of reference refer to similar parts and portions throughout the several views of the drawings.

The frame of my candy coating machine consists essentially of a plurality of upright members 1 and a platform 2 supported at their lower ends. On the platform 2 is supported the drive mechanism, and at the upper ends of the upright members 1 is supported the coating apparatus or mechanism. At the upper ends of and between the upright members 1 of the frame is mounted the combined coating drip-pan and reservoir 3. This combined drip-pan and reservoir is peculiarly shaped, being provided with a dome-shaped or raised bottom portion at its middle, as indicated by 3ª in Fig. 4, thus providing a relatively small receptacle or pan of annular construction and in channel form for the annular conveyer, as will be described hereafter. The portion of the dome connecting the middle raised portion with the extreme annular bottom portion diverges downwardly so as to readily deflect the heat, directed into the middle portion of the dome, downwardly along the diverging portion of the dome and evenly over the bottom side of the annular channel or receptacle. Directly below the combined drip-pan and receptacle or reservoir is positioned a burner 4 for supplying heat to the coating reservoir. Around the outer sides of the upright members 1 is mounted a drum or outer casing 5, which is spaced from the outer side walls of the combined drip-pan and reservoir 3 by means of the upright members 1, thereby retaining the heat, passing upwardly from the bottom of the reservoir, against the side walls thereof until the same escapes at the upper end. The casing member 5 also extends downwardly a considerable distance below the bottom of the reservoir 3 so as to retain the heat at the lower side of the latter at a more uniform temperature.

At the lower side of the reservoir 3 is secured a spider 6, which is provided at its middle portion with a journal in which, and in a journal portion 3ᵇ at the center of the dome-shaped portion 3ª of the reservoir 3, is revolubly mounted a stirring member drive sleeve 7, at the upper end of which is removably mounted the hub portion 8ª of the stirring member 8. The arms 8ᵇ of this stirring member consist of flat pieces of metal bent to conform with the interior of the reservoir and are spaced slight distances therefrom, as shown best in Fig. 4.

At the lower end of the vertical stirring member drive sleeve 7 is secured a sprocket wheel 9, which is driven by a chain 10 extending around a drive sprocket 11. The latter sprocket is secured to the upper end of a vertical shaft 12, which is journaled in a pair of brackets 13 and 14 supported by the upright members of the frame as shown. Near the lower end of the shaft 12 is mounted a large sheave 15, which is driven by a rope belt or cable 16 extending around a pair of idler sheaves 17 journaled on a bracket 18, and driven by a drive sheave 19. Said drive sheave is mounted on the drive shaft 20, which is journaled in brackets 21 mounted on the platform 2 of the frame. The drive shaft 20 is driven by any suitable means, such as a drive pulley 22, shown in Fig. 4.

In the sleeve 7 is mounted a conveyer supporting and drive spindle 23, which revolves in the direction opposite to that of the sleeve 7. Said spindle is provided near its upper end with a collar 23ª, which serves as a stop to limit the downward position of said spindle. At the upper end of the spindle 23 is removably mounted a spider 24 having a relatively long hub portion 24ª which is vertically adjustably mounted over the upper end of the spindle. Said hub portion is provided with a longitudinal slot 24ᵇ which extends through both sides and is adapted to receive a pin or key 25 which extends through the spindle 23 and is adapted to non-rotatably lock the spider 24 relatively to the spindle 23. The upper end of the hub portion 24ª is externally threaded and provided with an adjustable collar 26 which is adapted to engage the ends of the pin or key 25 and adjust the height of the conveyer relatively to its supporting and driving spindle 23. At the ends of the arms of the spider 24 is mounted the annular conveyer, which consists preferably of a pair of spaced apart, annular, concentric bands 27 and 28 positioned and secured relatively to each other by means of a plurality of tie rods 29 and by means of a multiplicity of closely positioned and radially extending wires 30, the latter extending between and being secured at their ends to the annular bands 27 and 28. The inner annular band 27 may be secured to the ends of the arms of the spider 24 by means of the tie rods 29, as shown. The outer annular band 28 is positioned just within the outer wall of the reservoir 3. The conveyer, as described, is positioned at the upper portion of the combined drip pan and reservoir so that the excess chocolate or other coating is permitted to drip onto the inclined wall of the dome-shaped portion 3ª of the reservoir or directly into the annular bottom portion thereof, as shown best in Fig. 4.

Near the lower end of the spindle 23 is secured a large sprocket 31, which is driven by a chain 32 extending around a pair of idler sprockets 33 and thence around a drive sprocket 34 mounted on the vertical shaft 12, as shown in Figs. 4 and 5. Thus, the spindle 23 revolves in the direction opposite to that of the sleeve 7. Therefore, the hotter chocolate or other coating dripping from the coated candies on the conveyer is forced, by means of the stirring or agitating member 8, into the discharge or feed opening 3ᶜ in the bottom of the channel-shaped annular reservoir, from which it is taken into a passage or conductor 35 and thence through a pump P to the conveyer.

On the drive-shaft 20 is mounted a notched wheel 36, which is adapted, by means of its notches, to intermittently raise a roller 37, positioned to engage the same. This roller 37 is revolubly mounted in a bifurcated portion 38ª provided at the lower end of a vertically reciprocating rod 38 which is positioned in alinement with the spindle 23 and is provided at its upper end with a socket 38ᵇ into which the lower end of said spindle extends. The notched wheel 36 is adapted to impart a vibratory motion, through the rod 38 and the spindle 23, to the annular conveyer, to facilitate the dripping of the excess chocolate or other coating from the candy or other coated products on the conveyer.

At the upper or discharge end of the frame of the pump P is mounted a head member 39 which is provided with a tubular side outlet portion 39ª which is directed towards the center of the machine. At the end of the portion 39ª is rotatably or tiltably mounted the tubular conductor 40, which is provided near its end with a longitudinal upwardly directed spout 40ª. To the upper end of the spout 40ª is secured the coating supporting, spreading and guide plate 41, which is of arcuate construction, as shown best in Fig. 2. Over the discharge end of the spout 41 is slidably mounted a plate 42 serving as a gate to adjust the discharge opening of the spout, as shown best in Figs. 2 and 3. The plate 42 is adapted to be variously tilted relatively to the under side of the annular conveyer, as shown in Fig. 3, so as to force the chocolate or other coating against the under side of the conveyer or through the supporting wires thereon as the conveyer progresses in its circular movement.

The upper end of the head member 39 is provided with a cylindrical socket 39ᵇ in which is rotatably mounted the hollow hub portion 43ª of the tubular conductor 43, which extends over the upper side of the annular conveyer and is provided near its free end and at its lower side with a downwardly directed discharge spout 43ᵇ, as shown best in Figs. 3 and 4. The discharge openings of the spouts 40ª and 43ᵇ are positioned opposite each other at respectively the lower and upper sides of the annular conveyer, so that the chocolate or other coating is applied to the centers of the candy or other product from below and above at the same time. It will be here noted that although the length of the discharge opening of the spout 43ᵇ is considerably less than the width of the annular conveyer, the candy centers over the whole width of the conveyer will be covered by reason of the coating spreading, as indicated by dotted lines in Fig. 4.

The mechanism of the pump P is enclosed in a sectional casing consisting of opposed hollow casing members 44 secured together in any suitable manner. Within the pump casing and between the casing members thereof is revolubly mounted a hollow rotor 45 having a cover 45ª at its one end, as shown best in Fig. 7. The main member of the hollow rotor 45 is provided with an extended shaft portion 45ᵇ at its axis, which shaft portion is revolubly mounted in a journal in one of the casing members 44. At the extended end of the shaft portion 45ᵇ, extending beyond the journal of the one casing member 44, is secured a sprocket 51, which is driven by a chain 52 extending around a drive sprocket 53 secured to the drive shaft 20. In the outer or annular wall of the rotor 45 is provided a plurality of longitudinal slots 45ᶜ into and through which extend pairs of opposed reciprocating pump blades 46. Each pair of opposed pump blades 46 is connected intermediate their ends with a longitudinally slotted connecting member 47, as shown best in Figs. 6 and 8. In the pump shown in the drawings there are two pairs of such opposed pump blades, the connecting members 47 of each pair being positioned to clear each other and preferably positioned against each other, as shown in Fig. 7. Within the hollow rotor 45 is positioned a cam 49, which is provided at one side with an axial supporting stem 49ª extending through the axial portion of the other casing member 44 and secured in position thereto by means of a set screw 50, as shown in Fig. 7. Said cam is also provided with another extended axial portion of reduced diameter, as indicated by 49ᵇ in Fig. 7, which portion extends to the opposite side of the main cam portion and is journaled in a recess in the shaft portion 45ᵇ of the main rotor member. The cam 49 is so shaped as to force two adjacent blades 46 at the one side of the pump outwardly from the rotor 45 against an arcuate surface 44ª at the inner side of the casing members 44. The opposite sides of the casing members 44 are provided with an arcuate surface, the radius of which is equal to the radius of the rotor, thus providing a seal between the same at said side of the pump casing. The opposed blades of the pump, being connected as stated, automatically force one of the blades of each pair inwardly as the other is forced outwardly, as shown in Fig. 6. To facilitate the operation of the cam 49 in shifting the pump blades 46 outwardly and inwardly, there are provided rollers 48 at the inner edges of the pump blades, as shown best in Fig. 8. The chocolate or other coating is drawn into the intake opening 44ᵇ of the pump casing from the conductor 35, and thence forced, by means of the blade 46, through the passage between the outer peripheral wall of the rotor and the arcuate wall 44ª of the pump casing to the discharge opening 44ᶜ of the pump casing and out through the discharge spouts. With this type of pump construction, a coating of any reasonable viscosity may be drawn from the bottom of the reservoir and discharged through the spout, or even a coating having large pieces of solids, such as nuts, and supercharged with nuts, may be readily handled with this type of pump.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a machine of the class described, an annular rotating foraminous conveyer, a pair of coating discharge spouts with openings at their adjacent sides, the one positioned above and the other below said conveyer, a combined drip-pan and hot reservoir positioned below said conveyer, and a coating conveying means supplying said spouts from said combined drip-pan and hot reservoir.

2. In a machine of the class described, an annular foraminous conveyer, a tiltable coating spreading and guiding plate positioned below said conveyer, and a coating discharge spout positioned below said conveyer with its opening in such a position relatively to said plate as to discharge its contents thereon.

3. In a machine of the class described, a foraminous conveyer, a tiltable coating spreading and guiding plate positioned below said conveyer, and a coating discharge spout positioned below said conveyer with its opening in such a position relatively to said plate as to discharge its contents thereon.

4. In a machine of the class described, an annular channel-shaped reservoir, an annular conveyer revolubly mounted immediately above said reservoir, and a coating supply spout positioned with its discharge opening above said conveyer.

5. In a machine of the class described, an annular channel-shaped reservoir, an annular conveyer revolubly mounted immediately above said reservoir, a coating supply spout positioned with its discharge opening above said conveyer, and another coating supply spout positioned with its opening directed upwardly to the under side of said conveyer.

6. In a machine of the class described, an annular channel-shaped reservoir, an annular conveyer revolubly mounted immediately above and relative to said reservoir, and a coating supply means positioned to supply a coating to a product carried by said conveyer.

7. In a machine of the class described, an annular channel-shaped reservoir, an annular conveyer revolubly mounted immediately above said reservoir, a coating supply spout positioned with its discharge opening above said conveyer, another coating supply spout positioned with its opening directed upwardly to the under side of said conveyer, said reservoir being provided with an outlet in its bottom and at one side thereof, and a unitary coating conveying means communicating with the opening in the bottom of said reservoir and with each of said spouts.

8. In a machine of the class described, an annular, channel-shaped, horizontally positioned reservoir having a discharge opening at one portion of its bottom, a stirring member revolubly mounted at the upper portion of said reservoir and provided with arms extending downwardly into the channel-shaped portion thereof, an annular conveyer revolubly mounted in a direction opposite to that of the stirring member and immediately above the annular channel-shaped reservoir, and means for supplying a coating to the upper side of said conveyer.

9. In a machine of the class described, an annular, channel-shaped, horizontally positioned reservoir having a discharge opening at one portion of its bottom, a stirring member revolubly mounted at the upper portion of said reservoir and provided with arms extending downwardly into the channel-shaped portion thereof, a conveyer revolubly mounted above said reservoir, and means for supplying a coating to the upper side of said conveyer.

10. In a machine of the class described, a circular reservoir having a raised middle portion forming a central, upwardly directed dome and an annular channel surrounding the middle raised bottom portion, a burner positioned below and at the middle portion of said reservoir, and a conveyer positioned immediately above said reservoir.

11. In a machine of the class described, an annular rotating foraminous conveyer, and a pair of coating discharge spouts with openings at their adjacent sides, the one positioned above and the other below said conveyer.

12. In a machine of the class described, an annular rotating foraminous conveyer, a coating discharge spout with an opening directed over the upper side of said conveyer, a combined drip-pan and hot reservoir positioned below said conveyer, and a coating conveying means supplying said spout from said combined drip-pan and hot reservoir.

In testimony whereof, I have hereunto set my hand at San Diego, California, this 22d day of January, 1926.

IRA SHAFER.